Nov. 2, 1965   P. MANSON   3,215,475
EXTENSION SLIDE DEVICE
Filed June 11, 1963   2 Sheets-Sheet 1
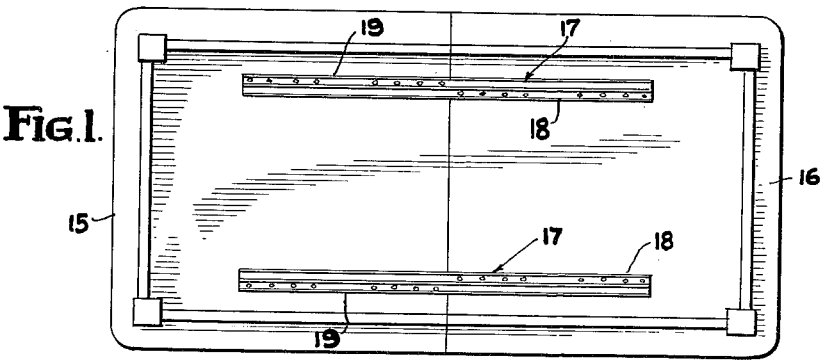
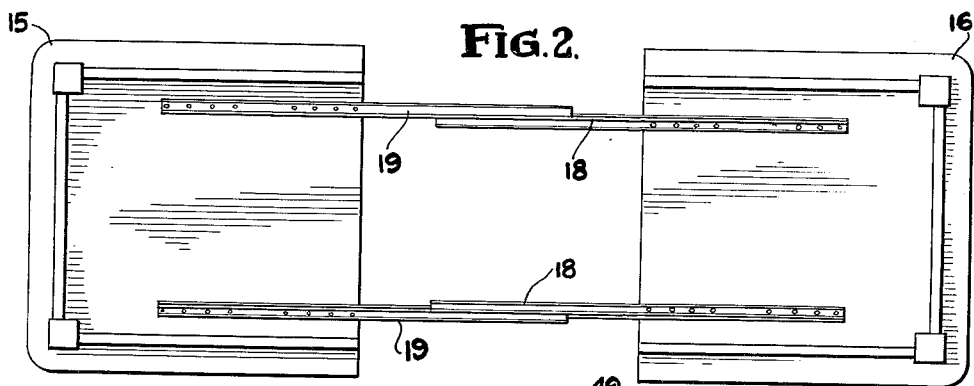
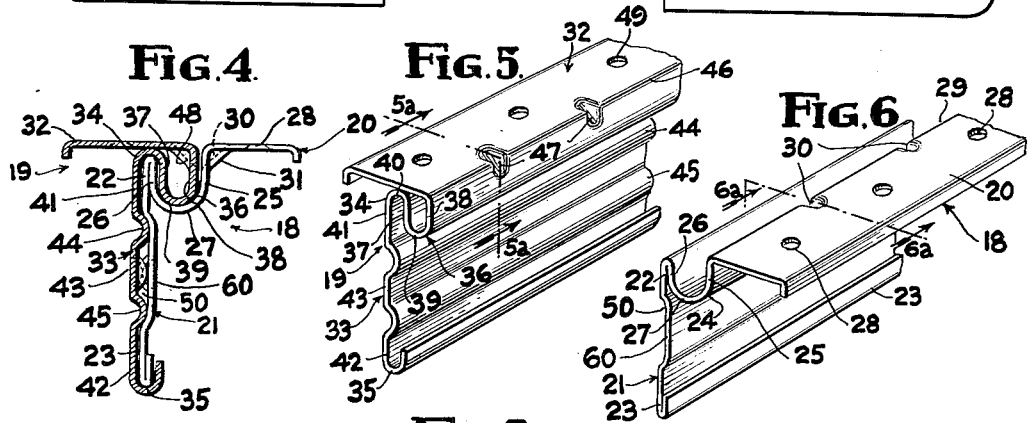
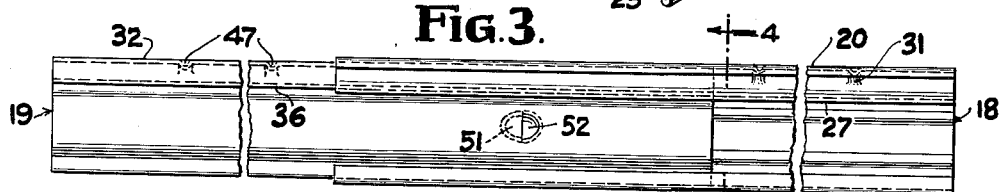
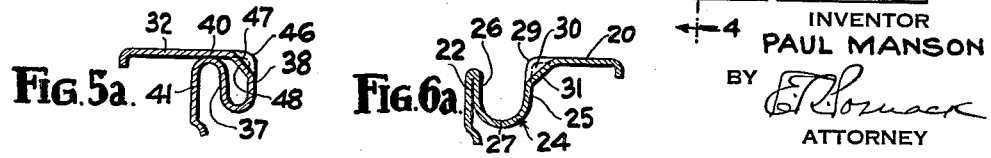
INVENTOR
PAUL MANSON
BY
ATTORNEY

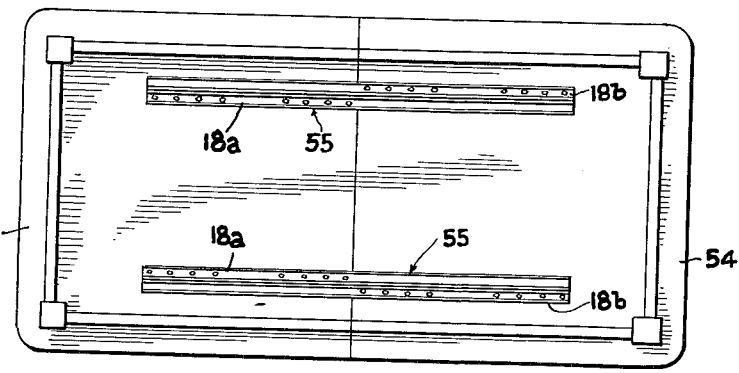
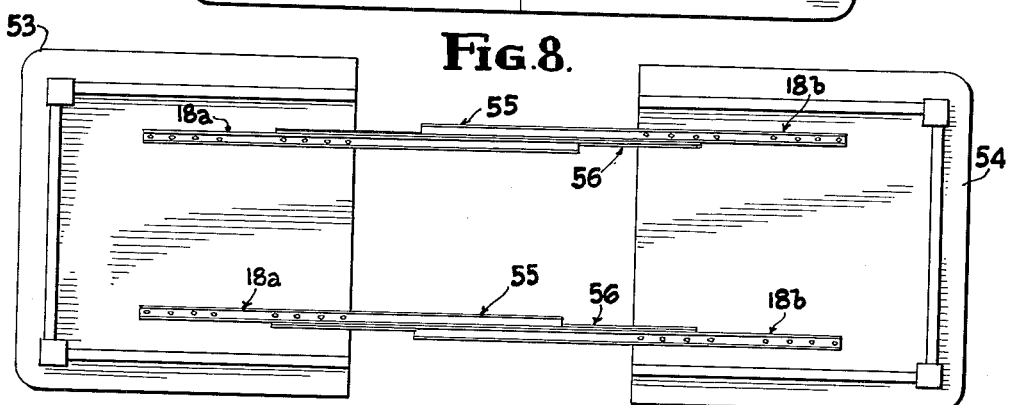
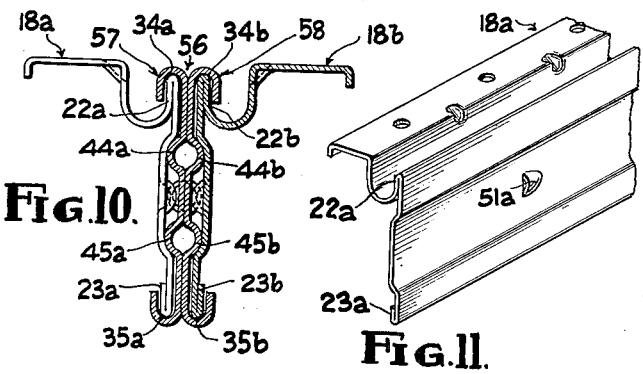
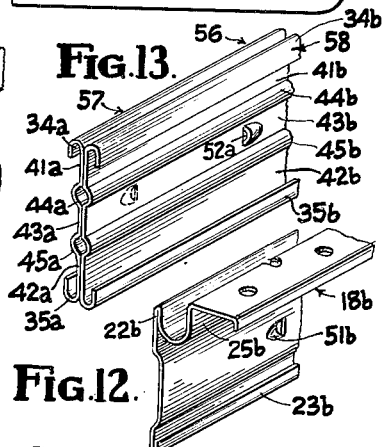
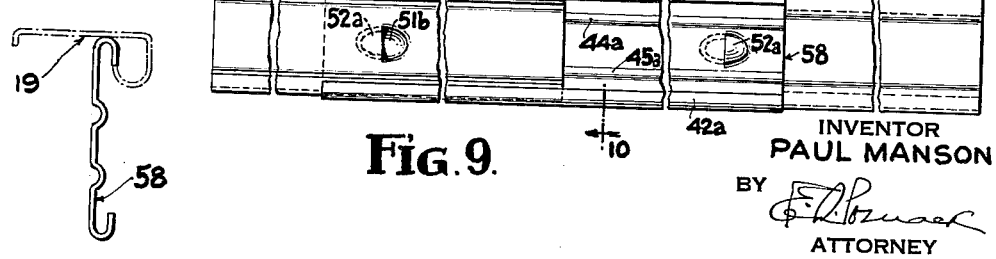

United States Patent Office 3,215,475
Patented Nov. 2, 1965

3,215,475
EXTENSION SLIDE DEVICE
Paul Manson, 9 Terrace Drive, Great Neck, N.Y.
Filed June 11, 1963, Ser. No. 287,152
1 Claim. (Cl. 308—3.6)

This invention relates to extension slide devices, and is particularly directed to extension arms for tables with separable sections adapted to accommodate therebetween one or more leaves.

It is an important object of this invention to provide an extension slide device of the above-mentioned category that is of extremely simple and low-cost construction, yet capable of enabling the extension of a coactively associated table to a predetermined length as effectively as could be performed by more complicated and more costly extension devices.

In the above-mentioned aspect of my invention it is my objective to provide a form of slide member attached to one of the table sections and adapted for coactive engagement with a basic channel member attached to the other table section for effecting a relatively limited extension of the table, said slide member being also adapted for coactive engagement with a novel form of center slide member unattached to the table for effecting a relatively greater extension of the table. And in the accomplishment of a further object of this invention, the said basic member is provided with a portion having a configuration identical to that of said center slide member, whereby the forming tool for making said center slide member may be employed for making the correspondingly-shaped portion of said basic member, thereby to effect economies in the manufacture of this device.

Another object of my invention is the provision of coacting extension components with full-length flange portions attached to the respective table sections, said components having reinforcing portions that eliminate the use of supporting brackets without requiring the use of relatively heavy material. And in this aspect of my invention it is another object to employ a slide component of such novel configuration as to provide integral reinforcing ribs in non-interfering relation to another integral portion of said component in slidable engagement with another member.

Other objects, features and advantages will appear from the drawings and the descriptions hereinafter given.

Referring to the drawings,

FIG. 1 is a bottom view of a table containing a pair of two-member slide sections according to my invention, the table being shown in closed position.

FIG. 2 is a bottom view of the table of FIG. 1 shown in its extended position.

FIG. 3 is an enlarged side elevation of one of the two-member slide sections of FIG. 2, parts being removed for convenience.

FIG. 4 is an enlarged section of FIG. 3 taken along line 4—4.

FIG. 5 is a fragmentary perspective view of the basic channel member shown in the above-mentioned figures.

FIG. 5a is a fragmentary section of FIG. 5 taken along line 5a—5a.

FIG. 6 is a fragmentary perspective view of the slide member adapted for coactive engagement with said basic channel member.

FIG. 6a is a fragmentary section of FIG. 6 taken along line 6a—6a.

FIG. 7 is a bottom view of a table containing a pair of three-member slide sections according to another form of my invention, the table being shown in its closed position.

FIG. 8 is a bottom view of the table of FIG. 7 shown in an operatively extended position.

FIG. 9 is an enlarged side elevation of one of the three-member sections of FIG. 8, parts being removed for convenience.

FIG. 10 is an enlarged section of FIG. 9 taken along line 10—10.

FIG. 11 is a fragmentary perspective of one of the slide members employed in the embodiment of my invention illustrated in FIGS. 7–14.

FIG. 12 is another of the slide members employed in the last-mentioned embodiment of my invention.

FIG. 13 is a fragemntary perspective of the center slide member adapted for coactive engagement with the members of FIGS. 11 and 12.

FIG. 14 is an end view of one of the channel portions of the center slide section illustrated in FIG. 10, the portion shown in dot-dash lines together with said channel portion constituting the entire basic channel section shown in FIG. 5.

In the form of my invention ilustrated in FIGS. 1 to 6, the table sections 15 and 16 are interconnected by the pair of two-member slide sections generally identified by the reference numerals 17, each of said sections comprising a slide member 18 and a basic channel member 19, said members being mutually slidably engageable in a manner to be hereinbelow described. Slide member 18 (see FIG. 6) comprises the flange 20, the vertical wall 21 with the upper and lower folded-over slide lips 22 and 23, respectively, and the loop section 24 connecting the said flange 20 and said folded-over lip 22. The said loop section 24 comprises the supporting wall 25, the inner wall 26 of said lip 22, and the bottom connecting wall 27. The said flange 20 has a plurality of holes 28 therein to accommodate fasteners for securing said flange to the table section 16. At the longitudinal juncture 29 of said flange 20 and wall 25 are a plurality of indentured portions 30, these being struck down to form transverse reinforcing ribs 31 (see FIGS. 4, 6 and 6a). The said ribs 31 serve to maintain the said wall 25 and flange 20 in fixed relative relation, so that wall 25 and the portions of member 18 supported thereby will not flex under operative stresses. The vertical wall 21 has the middle portion 60 thereof positioned inwardly with respect to the plane of lips 22 and 23, the latter being substantially in one plane as shown in FIG. 4. The configuration of wall 21 is such as not only to give slide member 18 greater strength for resistance against bending, but also to accommodate the stiffening members of a coactive member, as will hereinafter appear.

The basic channel member 19 (see FIG. 5) consists of the flange 32, the vertical wall 33 having at the respective upper and lower portions thereof the channel portions 34 and 35, and the upper supporting loop 36, the latter comprising the vertical wall 37, the opposite parallel vertical wall 38 and the connecting bottom wall 39, the said flange 32 being, in the particular form of my invention illustrated, in overlying contiguous relation to the arched top wall 40 of said upper channel portion 34. The said wall 33 comprises the respective upper and lower sections 41 and 42 and the intermediate section 43, the latter being flanked above and below by the longitudinal ribs 44 and 45, these ribs giving strength to said wall 33 and serving to prevent a flexing thereof. The said wall 37 of the supporting loop 36 is, in the preferred embodiment shown, parallel to said upper section 41 of wall 33. The said channel portions 34 and 35 are proportioned to slidably receive therein the said lips 22 and 23 of the said slide member 18. The longitudinal juncture 46 of the flange 32 and wall 38 has the spaced indentures 47 similar to the above-mentioned indentures 30, these being struck down to form the transverse ribs 48 (see FIGS. 5a and 4), to maintain the wall 38 and flange 32 in fixed relative relation. The arrangement is hence such that vertical wall 33 and the channelled portions 34 and 35 are at all times maintained against displacement with respect to the table section to which said member 19 is operatively attached. Such attachment is effected by suitable fasteners extending through the spaced holes 49 in said flange 32.

When the parts are operatively assembled, as clearly illustrated in FIGS. 3 and 4, the lips 22 and 23 are slidably positioned within the channels 34 and 35, so that when the table sections 15 and 16 are operatively separated or operatively brought together, the coacting lips and channels will at all times be in proper coactive relation. The position of said inwardly protruding portion 60 of wall 21 of the member 18 is such as to provide a recess 50 for accommodating the said ribs 44 and 45 of the wall 33 of the channel member 19.

It is of particular importance to note that the operative sliding movement of the said lips 22 and 23 of slide member 18 within the said channels 34 and 35 is not interfered with by said transverse ribs 31 and 48 of the respective slide and channel members 18 and 19, as clearly appears from FIG. 4. This is due to the spaced relation between the supporting wall 25 and the slide lip 22 in slide member 18, resulting from the novel configuration of the supporting loop portion 24 hereinabove described. And the arrangement is such that the vertical walls 21 and 33 of the respective members 18 and 19 are at all times supported in their relative operative positions, and maintained against deflection without the use of any bracket or other separate supporting members. It is further to be noted that slide member 18 has the limit stop 51 struck out from the wall 21, and that the channel member 19 has a similar limit stop 52 formed therein, both of said stops coming into abutment when they are in their predetermined outermost or fully extended positions, as shown in FIG. 3.

In the form of my invention shown in FIGS. 7 to 14, the table sections 53 and 54 are separable in the manner hereinabove described with respect to corresponding table sections 15 and 16. Operatively attached to the undersides of said table sections are the three-member slide sections generally designated 55. Each of said sections consists of two slide members 18a and 18b, these being similar to slide member 18 hereinabove described. In the embodiment illustrated, slide member 18a is attached to section 53 of the table, and slide member 18b to section 54, both members being slidably engageable with the center slide section generally designated 56. The said latter member comprises two channel members 57 and 58 welded or otherwise operatively secured together. As will be noted from FIGS. 10 and 13, channel member 57 contains the upper and lower walls 41a and 42a, respectively, and the middle wall 43a, the latter being flanked by the parallel ribs 44a and 45a, there being channel portions 34a and 35a at the respective upper and lower portions of said member 57. Member 58 is of similar configuration, with walls 41b, 42b and 43b in opposed relation to the respective walls 41a, 42a and 43a, the ribs 44b and 45b being in opposed aligned relation to the said ribs 44a and 45a of member 57; and the upper and lower portions of member 58 contain the respective channels 34b and 35b. As will be noted from FIG. 10, the folded-over lips 22a and 23a are slidably positioned within the respective channels 34a and 35a, and the folded-over lips 22b and 23b are slidably positioned within the respective channels 34b and 35b. Only the members 18a and 18b are, as aforesaid, attached to the respective table sections 53 and 54; so that upon an operative separation or closing of the table sections, the slide members 18a and 18b are slidably moved within the correspondingly positioned channels of the two channel members 57 and 58 of the center slide section 56.

The rib structures employed in this embodiment are similar to those employed in the form first above described, so that the slide members are at all times maintained in fixed relation to the table, thereby assuring stability and ease of sliding movement. The said channel members 57 and 58 have the stops 52a similar to stops 52 of the form shown in FIGS. 3 and 5; and the slide members 18a and 18b have the stop members 51a and 51b of similar construction. The arrangement is hence such that when the table is operatively extended a predetermined amount, the said stops 51a and 51b come into engagement with the respective stops 52a on said center member 56.

By referring to FIG. 14 it will be noted that channel member 58 constitutes the channel portion of the basic channel member 19 hereinabove referred to, the channel portion being shown in full lines and the dotted portion showing the additional portion constituting part of said member 19. This construction provides an economical, as well as an efficient, device, for channel members 57 and 58 are formed from similar tools, and such tools can also be employed in the formation of the main channel portion of the basic channel member 19. Since the cost factor is an extremely important element in competitive merchandising of items in this category, the savings in tool costs, and in the consequent setting up and handling costs, constitute one of the important features of this invention.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claim.

I claim:

In an extension slide device for a table with separable sections, two slide members attachable to said respective separable sections and one center member in slidable engagement with said respective slide members, each of said slide members having a horizontal flange, a vertical wall, upper and lower slide lips at the respective upper and lower portions of said wall, and a U-shaped loop section having two legs with a bottom connecting wall, one of said legs being joined to the upper of said lips, the other of said legs being integrally joined to said flange, said center member comprising two attached components each having a vertical wall and upper and lower channel portions in slidable engagement with the respective upper and lower lips of one of said slide members, the upper channel portions of each of said components having sections thereof extending into and in slidable engagement with the said respective U-shaped loop sections of said respective slide members.

References Cited by the Examiner

UNITED STATES PATENTS

| 893,187 | 7/08 | Montague | 312—335 |
| 1,526,506 | 2/25 | Schilling | 308—3.6 |
| 2,844,430 | 7/58 | Bogar | 308—3.6 |
| 2,865,684 | 12/58 | Meyer | 308—3.6 |

FOREIGN PATENTS

| 1,128,572 | 6/55 | France. |
| 849,145 | 9/60 | Great Britain. |

DON A. WAITE, *Primary Examiner.*

FRANK SUSKO, *Examiner.*